US011661121B2

United States Patent
Salter et al.

(10) Patent No.: US 11,661,121 B2
(45) Date of Patent: May 30, 2023

(54) CARGO MANAGEMENT SYSTEM FOR A VEHICLE

(71) Applicant: Ford Global Technologies, LLC, Dearborn, MI (US)

(72) Inventors: Stuart C. Salter, White Lake, MI (US); David Brian Glickman, Southfield, MI (US); Hussein H. Berry, Dearborn, MI (US); Aaron Halonen, Brighton, MI (US); Paul Kenneth Dellock, Northville, MI (US); Annette Lynn Huebner, Highland, MI (US); Sarah A. Ripley, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 170 days.

(21) Appl. No.: 17/195,784

(22) Filed: Mar. 9, 2021

(65) Prior Publication Data

US 2022/0289313 A1    Sep. 15, 2022

(51) Int. Cl.
*B62D 33/08*    (2006.01)
*B62D 33/02*    (2006.01)

(52) U.S. Cl.
CPC ......... *B62D 33/08* (2013.01); *B62D 33/0207* (2013.01)

(58) Field of Classification Search
CPC .. B60R 7/02; B60R 7/005; B60R 9/00; B60R 11/06; B60R 11/00; B60R 2022/005; B65B 67/1205; B62D 33/08; B62D 33/0207
See application file for complete search history.

(56) References Cited

U.S. PATENT DOCUMENTS

| | | | |
|---|---|---|---|
| 5,492,257 A * | 2/1996 | Demick | B60R 7/02 296/37.16 |
| 6,394,326 B1 * | 5/2002 | Lanier | B60R 9/00 296/3 |
| 6,830,418 B2 | 12/2004 | Keramidis | |
| 7,651,146 B2 | 1/2010 | Anderson et al. | |
| 7,708,329 B2 * | 5/2010 | Duller | B60R 7/005 296/37.16 |
| 10,160,390 B2 * | 12/2018 | Na | B60R 7/005 |
| 2010/0193555 A1 | 8/2010 | Gift | |

* cited by examiner

*Primary Examiner* — Corey N Skurdal
(74) *Attorney, Agent, or Firm* — Vichit Chea; Carlson, Gaskey & Olds, P.C.

(57) ABSTRACT

A vehicle cargo management system includes, among other things, an outer member of a cargo retention frame and an inner member of the cargo retention frame. The inner member is at least partially received within the outer member. A locking device is transitionable back and forth between a locked position and an unlocked position. The outer and inner members are slideable relative to each other when the locking device is in the locked position. The outer and inner members are fixed relative to each other when the locking device is in the unlocked position.

17 Claims, 7 Drawing Sheets

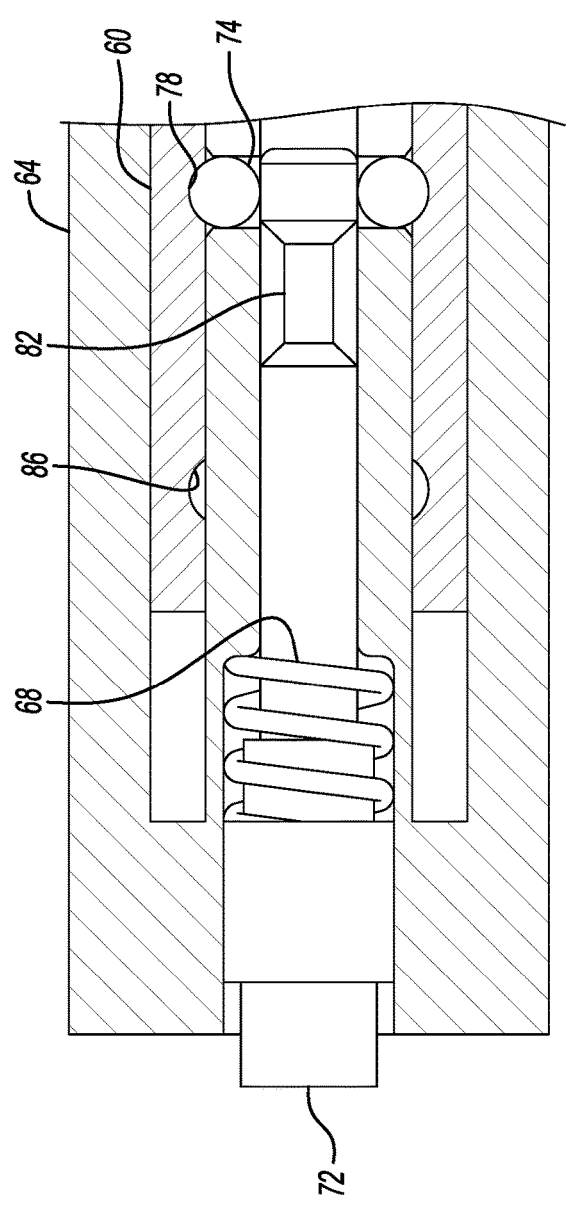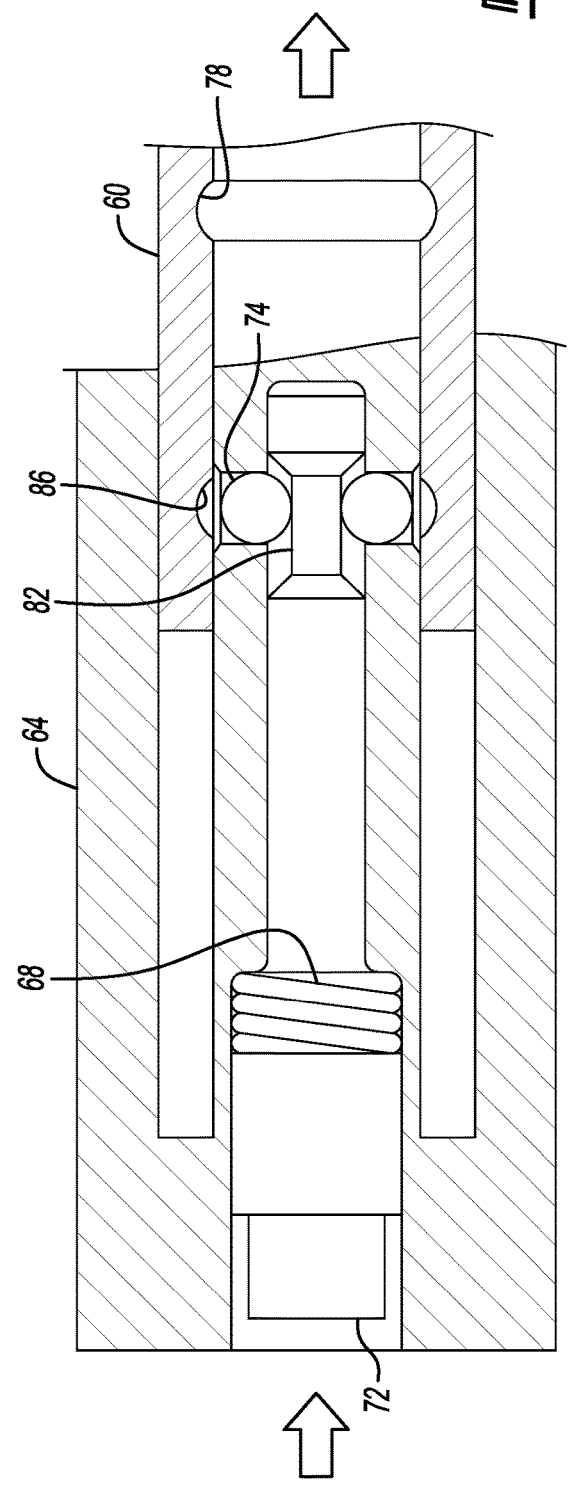

CARGO MANAGEMENT SYSTEM FOR A VEHICLE

TECHNICAL FIELD

This disclosure relates generally to vehicle cargo management and, more particularly, to a frame that can adjust to manage different sizes and types of cargo.

BACKGROUND

Vehicles, such as pickup trucks, can include a cargo bed used to store cargo. The cargo bed can be provided aft of a passenger compartment. Vehicles can include other areas for storing cargo, such as trunks and frunks.

SUMMARY

A vehicle cargo management system according to an exemplary aspect of the present disclosure includes, among other things, an outer member of a cargo retention frame and an inner member of the cargo retention frame. The inner member is at least partially received within the outer member. A locking device is transitionable back and forth between a locked position and an unlocked position. The outer and inner members are slideable relative to each other when the locking device is in the locked position. The outer and inner members are fixed relative to each other when the locking device is in the unlocked position.

In another example of the foregoing vehicle cargo management system, the cargo retention frame extends circumferentially continuously about an entire periphery of a frame aperture that is configured to receive cargo.

In another example of any of the foregoing vehicle cargo management systems, the inner and the outer members are configured to extend relative to each other to increase a size of the frame aperture. Further, the inner and outer members are configured to retract to decrease a size of the frame aperture.

In another example of any of the foregoing vehicle cargo management systems, the cargo retention frame is pivotably secured to a wall of a cargo bed.

Another example of any of the foregoing vehicle cargo management systems includes a biasing member that biases the cargo retention frame to a stowed position where the cargo retention frame abuts the wall of the cargo bed.

Another example of any of the foregoing vehicle cargo management systems includes a hinge system that pivotably secures the cargo retention frame relative to the wall.

In another example of any of the foregoing vehicle cargo management systems, the cargo retention frame is configured to pivot relative to the wall about a horizontally extending axis.

In another example of any of the foregoing vehicle cargo management systems, the cargo retention frame is configured to pivot relative to the wall about a vertically extending axis.

In another example of any of the foregoing vehicle cargo management systems, the cargo retention frame is pivotably secured to a cargo hold of the vehicle.

In another example of any of the foregoing vehicle cargo management systems, at least one snap lock feature holds a portion of the cargo retention frame within a groove of the cargo hold to pivotably secure the cargo retention frame to the cargo hold.

In another example of any of the foregoing vehicle cargo management systems, the at least one snap lock feature is a bearing.

In another example of any of the foregoing vehicle cargo management systems, the cargo retention frame is moveable between a stowed position and an extended position. A first section of the cargo retention frame is folded over a second section of the cargo retention frame when the cargo retention frame is in the stowed position. The first section and the second section are side by side when the cargo retention frame is in the extended position.

In another example of any of the foregoing vehicle cargo management systems, the first section is pivotably connected to the second section.

In another example of any of the foregoing vehicle cargo management systems, the cargo retention frame is a first cargo retention frame pivotably secured to a driver side cargo bed wall. The system further includes a second cargo retention frame pivotably secured to a passenger side cargo bed wall. The first cargo retention frame in the extended position is configured to engage the second cargo retention frame in an extended position such that the first cargo retention frame and the second cargo retention frame together span from the driver side cargo bed wall to the passenger side cargo bed wall.

Another example of any of the foregoing vehicle cargo management systems includes at least one hook that engages the first cargo retention frame with the second cargo retention frame when the first and second cargo retention frames are in extended positions.

A method of managing cargo according to an exemplary aspect of the present disclosure includes, among other things, holding cargo within an aperture of a cargo retention frame of a frame aperture that is pivotably connected to a vehicle. The frame is adjustable to change a size of the frame aperture.

Another example of the foregoing method includes biasing the frame to a stowed position where the cargo retention frame abuts the wall of the cargo bed.

In another example of any of the foregoing methods, the cargo retention frame is pivotably secured to a wall of a vehicle cargo bed.

Another example of any of the foregoing methods includes inner members at least partially received within outer members of the frame. The inner members are extended relative to the outer members other to increase a size of the frame aperture. The inner members are retracted relative to the outer members to decrease a size of the frame aperture.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 5 shows a section taken at line 5-5 in FIG. 4 of the frame in an exemplary retracted position.

FIG. 6 shows a section taken at line 6-6 in FIG. 4 of the frame in an exemplary extended position.

DETAILED DESCRIPTION

This disclosure details an exemplary vehicle cargo management system. In particular, this disclosure details cargo management system having a frame that can extend and retract to accommodate various types and sizes of cargo.

Although described in connection with managing cargo that is within cargo bed of a pickup truck, exemplary embodiments the cargo management system can be used in connection with other types of vehicles, and in areas of vehicles other than a cargo bed.

Figure 1:
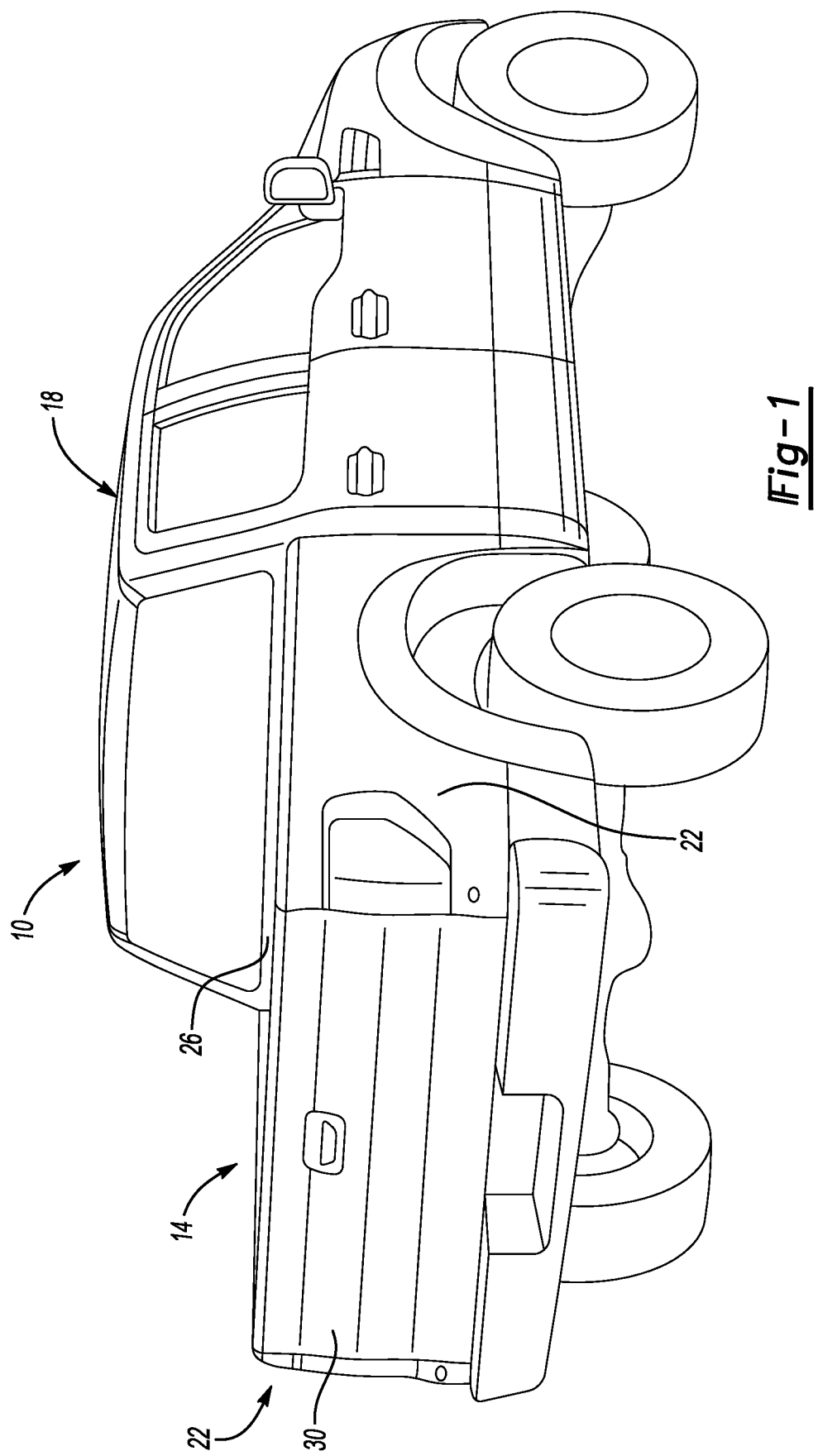
FIG. 1 shows a perspective view of the vehicle having a cargo bed.

With reference to FIG. 1, a vehicle 10, here a pickup truck, includes a cargo bed 14 aft a passenger compartment 18 of the vehicle 10. The cargo bed 14 is generally defined by side walls 22, a front wall 26, and a tailgate 30, which acts as a rear wall when closed. The cargo bed 14 can be utilized to transport various types of cargo.

Figure 2:
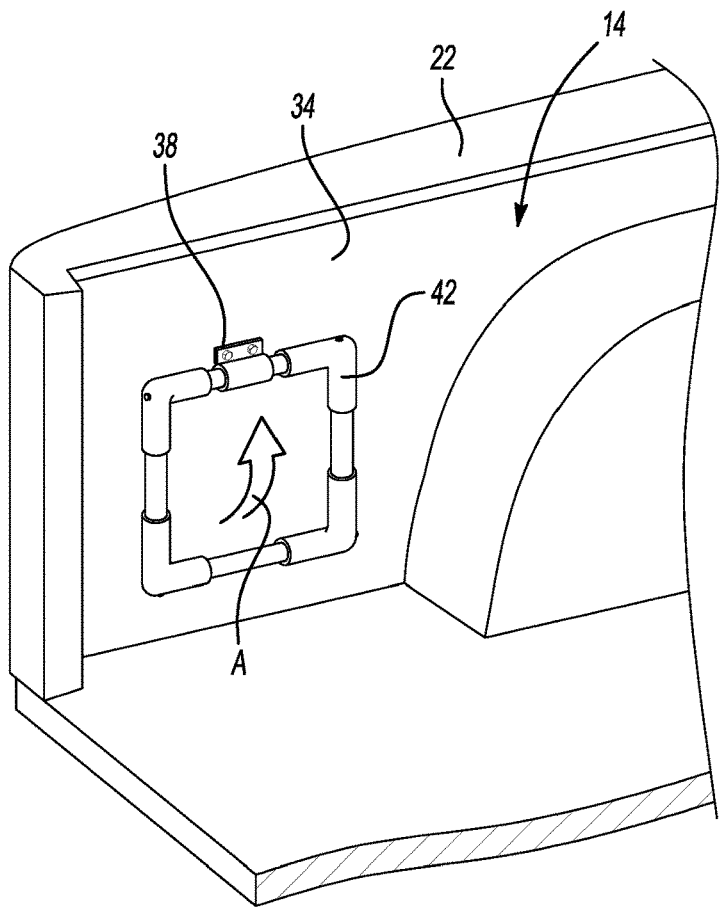
FIG. 2 shows a close-up view of a portion of a wall of the cargo bed in FIG. 1 along with a cargo management system according to an exemplary aspect of the present disclosure.
Figure 3:
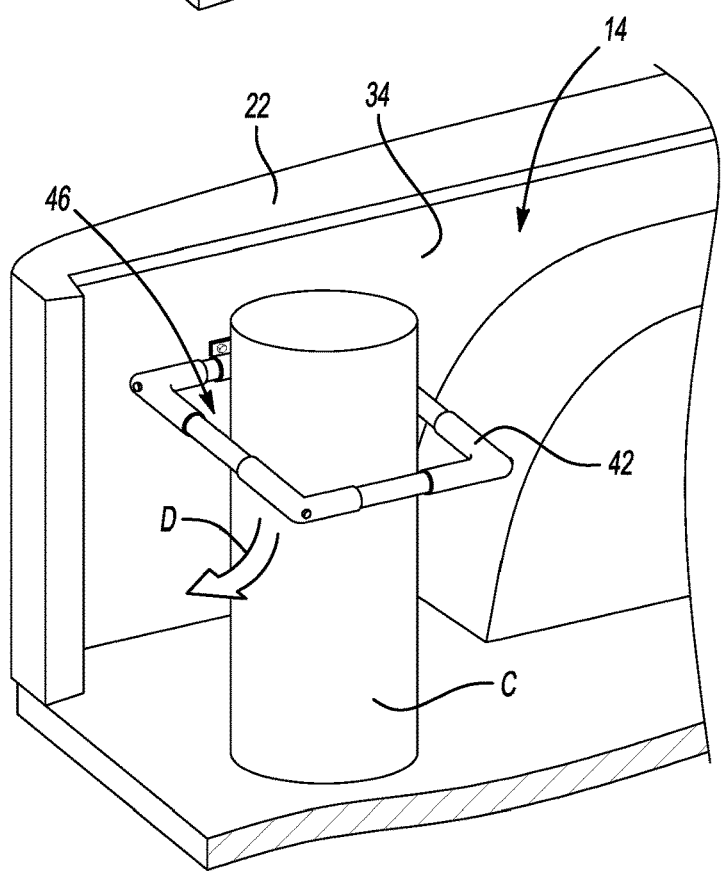
FIG. 3 shows the cargo management system of FIG. 2 in an exemplary extended position.
Figure 4:
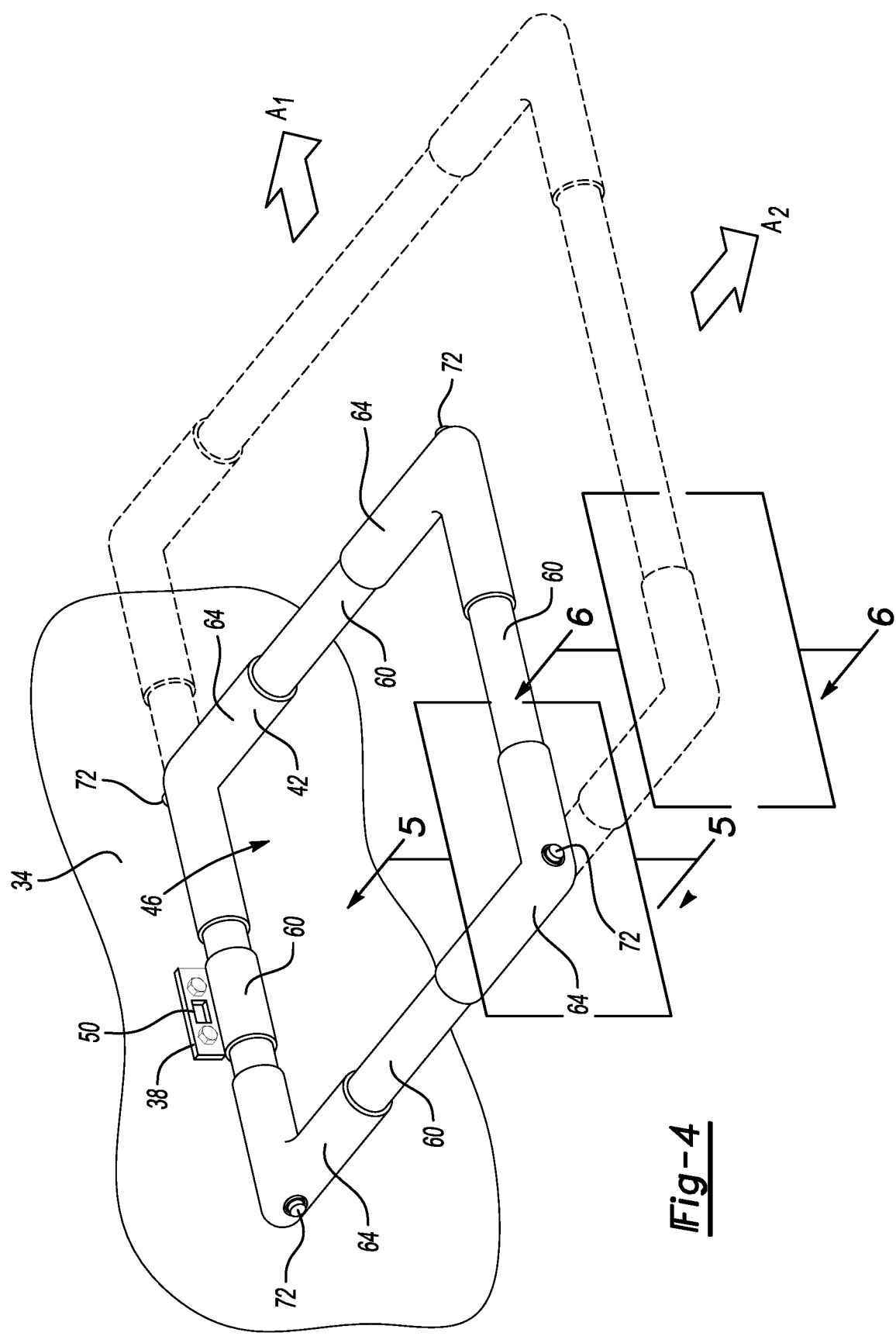
FIG. 4 shows a frame of the cargo management system of FIGS. 2 and 3 with broken lines showing how the frame can transition to an extended position.

With reference now to FIGS. 2-4 and continuing reference to FIG. 1, the side walls 22 each include an inner panel 34. A hinge system 38 couples a cargo retention frame 42 to the inner panel 34. In this exemplary embodiment, the hinge system 38 and the cargo retention frame 42 are parts of the cargo retention system that is used to secure cargo within the cargo bed 14.

The hinge system 38 permits movement of the cargo retention frame 42 back-and-forth between a stowed position shown in FIG. 2 and an extended position shown in FIG. 3. The hinge system 38 permits the cargo retention frame 42 to pivot relative to the side wall 22 about a horizontally extending axis AH.

In the stowed position, the cargo retention frame 42 is positioned against the inner panel 34. The example cargo retention frame 42 can flip up from the stowed position, as shown by the arrow A in FIG. 2, into the extended position.

The cargo retention frame 42 can be used to manage cargo C when the cargo retention frame 42 is in the extended position. The cargo C can, for example, be held within a frame aperture 46 of the cargo retention frame 42. The cargo C can be secured by the cargo retention frame 42 when the cargo C is received within the frame aperture 46. The cargo retention frame 42 helps keep the cargo C from being jostled around in the cargo bed 14 when the vehicle 10 is driven. In this example, the cargo retention frame 42 extends circumferentially continuously about an entire periphery of the frame aperture 46.

In some examples, the inner panel 34 includes an opening to a storage compartment that is within the side wall 22. The cargo retention frame 42 can be positioned near or over the opening or a lid covering the opening. In so doing, the cargo retention frame 42 can help to manage cargo that is extending through the opening or contacting the lid.

In this example, the hinge system 38 that connects the cargo retention frame 42 to the inner panel 34 includes the biasing element 50. The biasing element 50 can be a spring that spring-loads the hinge system 38.

The biasing element 50, in this example, biases the cargo retention frame 42 toward the stowed position where the cargo retention frame 42 is placed against the side wall 22. Biasing the cargo retention frame 42 toward the inner panel 26 can urge the cargo C toward the inner panel 26 to help to hold the cargo C. Both gravity and the biasing element 50 can help to lock the cargo retention frame 42 onto the cargo C.

Referring to FIG. 4, the cargo retention frame 42 can extend and retract along a first axis A1. The cargo retention frame 42 can also extend and retract along a second axis A2. Extending and retracting along the axis A1, the axis A2, or both, changes the size of the frame aperture 46, which allows the cargo retention frame 42 to adapt to cargo C of various sizes.

Generally, with reference to FIGS. 4-6, the cargo retention frame 42 includes inner members 60, outer member 64, biasing members 68, actuator members 72, and lock bearings 74. The inner members 60 are received within an outer member 64. In this example, opposing ends of each of the inner members 60 are received within respective outer members. The lock bearings 74 and actuator members 72 together provide a locking device. The section views of FIGS. 5 and 6 show how the exemplary cargo retention frame 42 can extend and retract to change the size of the frame aperture 46.

In a first position shown in FIG. 5, extension and retraction of the inner member 60 relative to the outer member 64 is blocked by the lock bearings 74 being pressed radially outward into a groove 78 of the inner member 60. When the lock bearings 74 and actuator members 72 block extension and retraction of the inner member 60 relative to the outer member 64, the locking device is in a locked position.

As shown in FIG. 6, the actuator member 72 can be pressed by a user desiring to transition the locking device to an unlocked position to permit extending or retracting the cargo retention frame 42. When pressed, the actuator member 72 compresses the biasing member 68, which moves the inner member 60 relative to the lock bearings 74. The inner member 60 shift to a position where the lock bearings 74 can move radially inward into an annular channel 82 of the inner member 60.

When moved radially inward, the lock bearings 74 move out of the groove 78 of the outer member 64. The inner member 60 and the outer member 64 can then slide to extend and retract relative to each other. When the lock bearings 74 and actuator members 72 permit extension and retraction of the inner member 60 relative to the outer member 64, the locking device is in an unlocked position.

After extending the inner member 60 relative to the outer member 64 to the position of FIG. 6, the user can release the actuator member 72. The biasing member 68 then urges the actuator member 72 back to the position of FIG. 5, which presses the lock bearings 74 radially outward into a groove 86 of the inner member 60. This transitions the locking device from the locked position back to the unlocked position. The lock bearings 74 when pressed into the groove 86 locks the inner member 60 and the outer member 64 in the position of FIG. 6.

Figure 7:
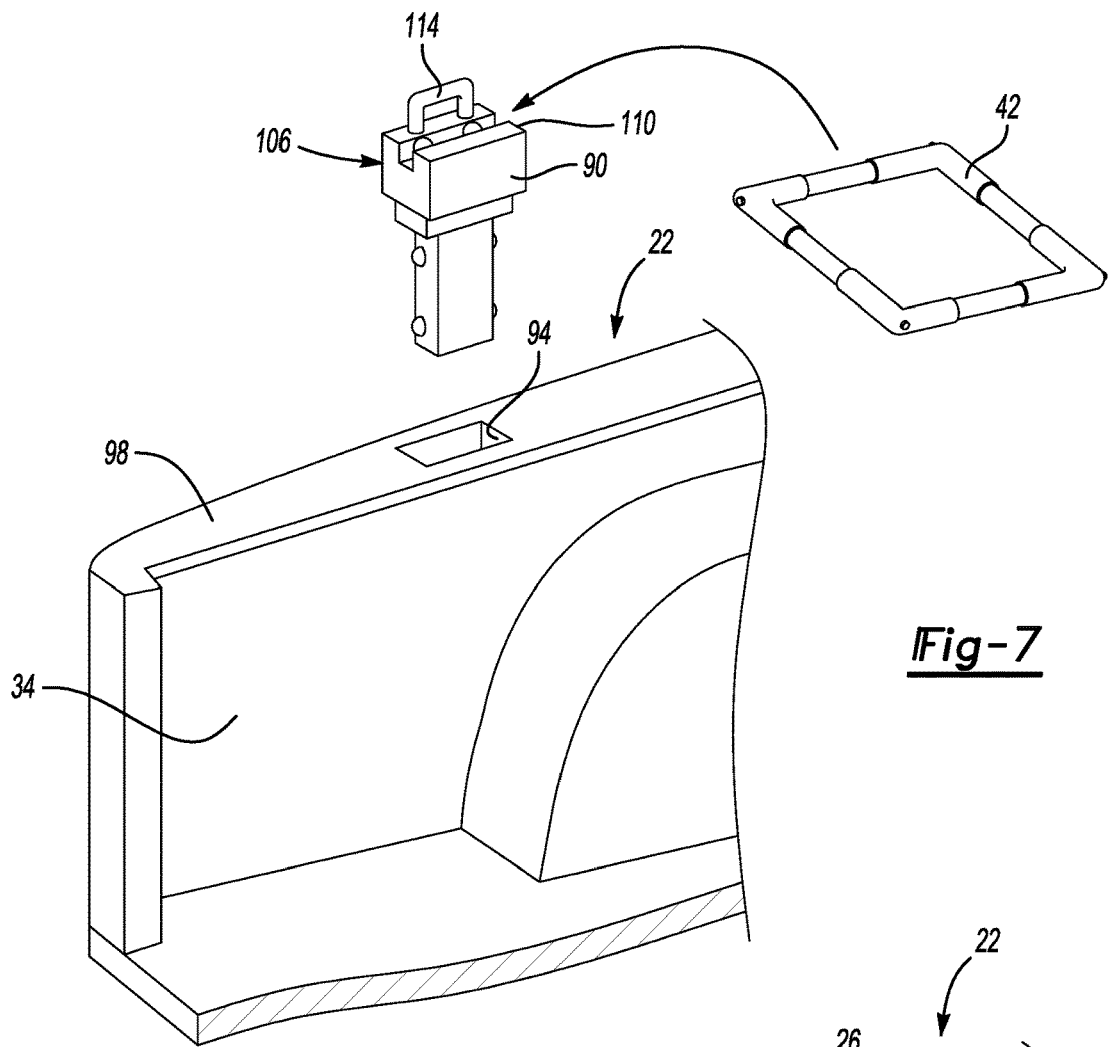
FIG. 7 shows another example where the frame is secured relative to the vehicle by a cargo hold that is atop the wall of the cargo bed.

With reference to FIG. 7, rather than being hinged to the inner wall 34 of the side wall 22, the cargo retention frame 42, in another exemplary embodiment, is secured to a cargo hold 90 that extends into a stake pocket 94 opening to a top 98 of the side wall 22. Snap fit tabs 102 can hold the cargo hold 90 within the stake pocket 94. The snap fit tabs 102 can extend outward to engage an underside of the top 98 or sides of the stake pocket 94. The snap fit taps 102 prevent the cargo hold 90 from being withdrawn from the stake pocket 94.

The cargo hold 90, in the exemplary embodiment, includes a groove 106 extending along a longitudinal axis. The groove 106 is configured to receive and hold a portion of the cargo retention frame 42. Snap-lock features, here snap-lock bearings 110, hold the cargo retention frame 42 into the groove 106 in this example. The snap-lock bearings 110 permit pivoting of the cargo retention frame 42 within the groove 106.

A squeeze handle 114 can be actuated to release the snap-lock bearings 110 to permit removal of the cargo retention frame 42 from the groove 106. When held within the groove 106 by the snap-lock bearings 110, the cargo retention frame 42 can pivot about the longitudinal axis of the groove 106 and extend and retract as described in connection with FIGS. 4-6.

Figure 8:
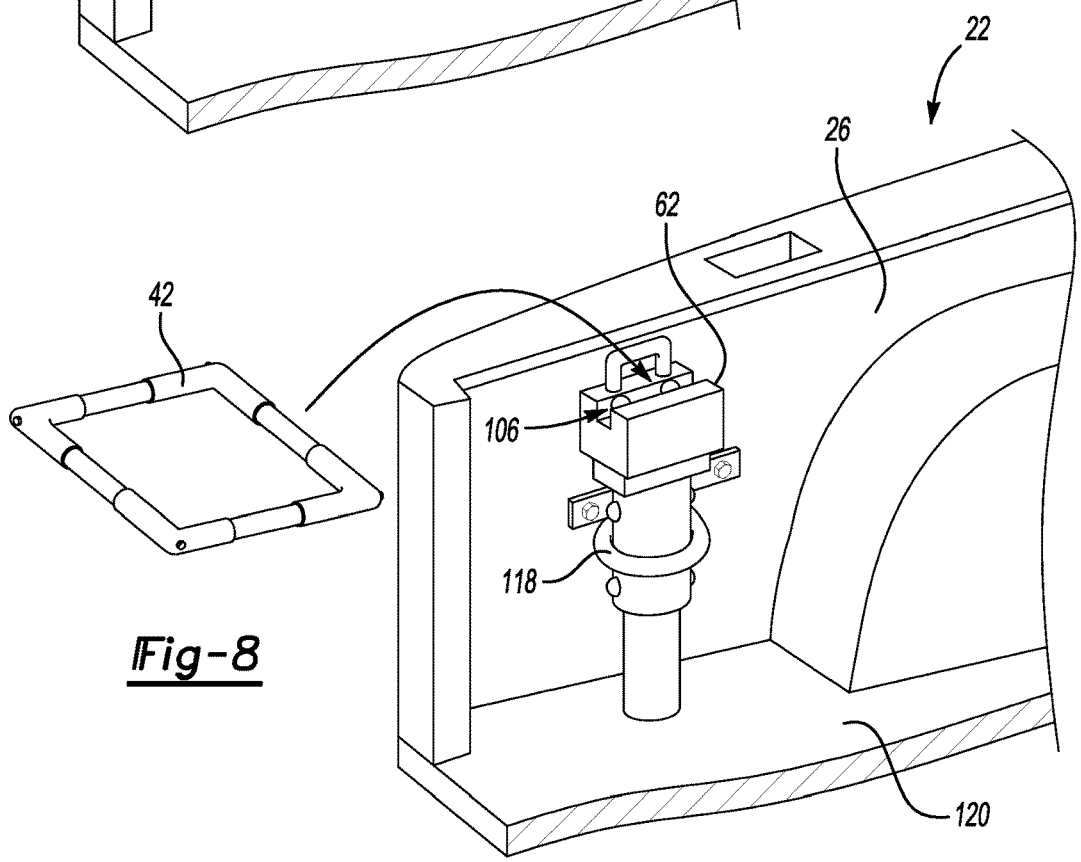
FIG. 8 shows another example where the frame is secured relative to the vehicle by a cargo hold that is adjacent an inner panel of the wall of the cargo.

With reference to FIG. 8, the cargo retention frame 42 could, in yet another example, be secured to the cargo hold 90 when the cargo hold 90 is secured to the inner panel 34. In this example, the cargo hold 90 is secured to the inner panel 34 via a tie down anchor 118 which is directly attached to the inner panel 26 with mechanical fasteners. Surfaces of the cargo hold 90 that extend through the aperture of the tie down anchor 118 can be shaped to match a profile of the aperture. The cargo hold 90 can extend downward from the tie down anchor 118 to a floor of the cargo bed 14.

Figure 9:
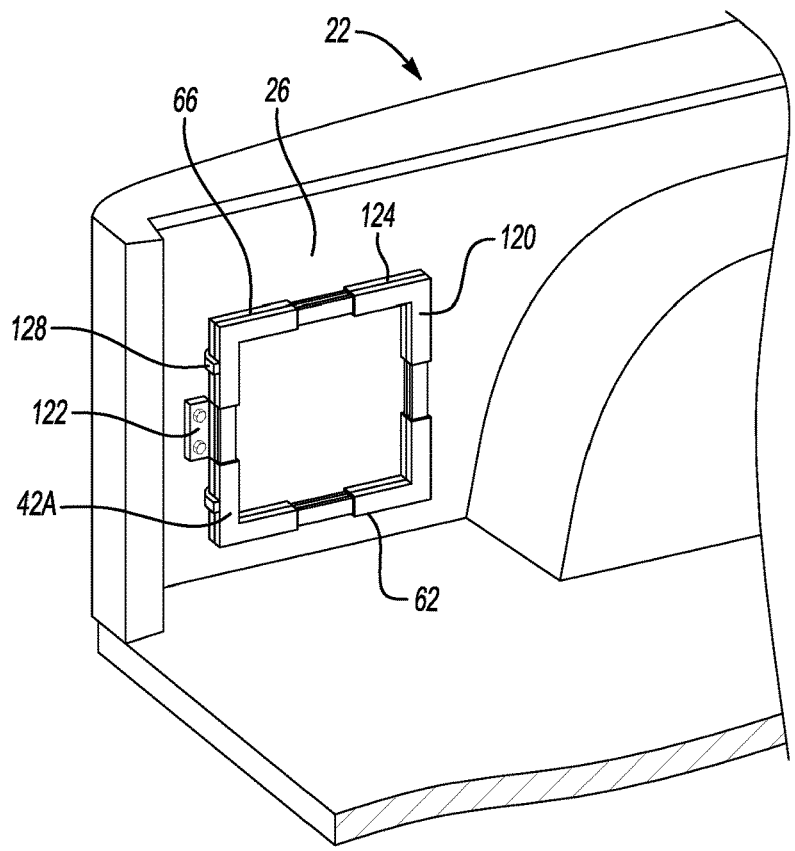
FIG. 9 shows a frame of a cargo management system according to another exemplary aspect of the present disclosure.
Figure 10:
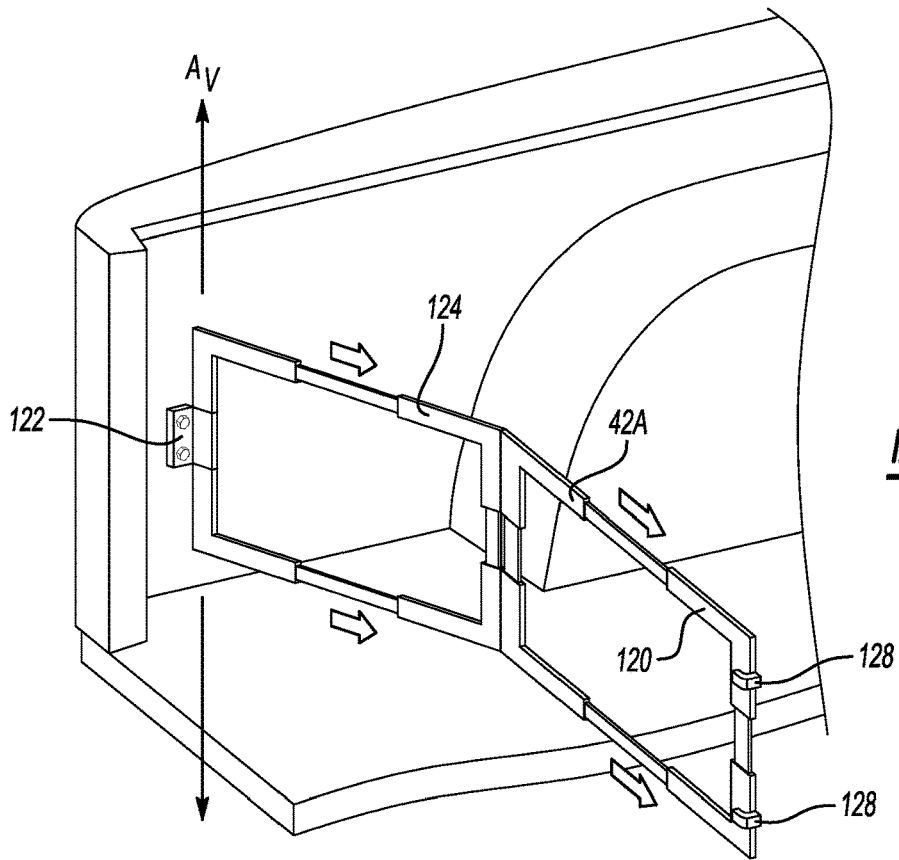
FIG. 10 shows the frame of FIG. 9 in an expanded position.

FIGS. 9 and 10 illustrate a cargo retention frame 42A according to another exemplary aspect of the present disclosure. A hinge system 122 pivotably connects the cargo retention frame 42A to the inner panel 26 and is configured to pivot relative to the inner panel 26 about a vertically extending axis Av. The cargo retention frame 42A can pivot about the axis Av from the stowed position shown in FIG. 9 where the cargo retention frame 42A includes a first section 120 folded over a second section 124, to the extended position shown in FIG. 10.

The first section 120 is pivotably connected to the second section 124. The first section 120 and second section 124 pivot relative to each when the cargo retention frame 42A is transition back-and-forth between the stowed position and the extended position.

In the extended position, the cargo retention frame 42A could connect to another cargo retention frame that extends from a panel of a passenger side wall. One or more hooks 128 could be used to connect the cargo retention frame 42A to the other cargo retention frame extending from the passenger side wall. In this example, the cargo retention frame 42A includes two hooks 128. In another example, the other cargo retention frame could include the hooks 128.

Figure 11:
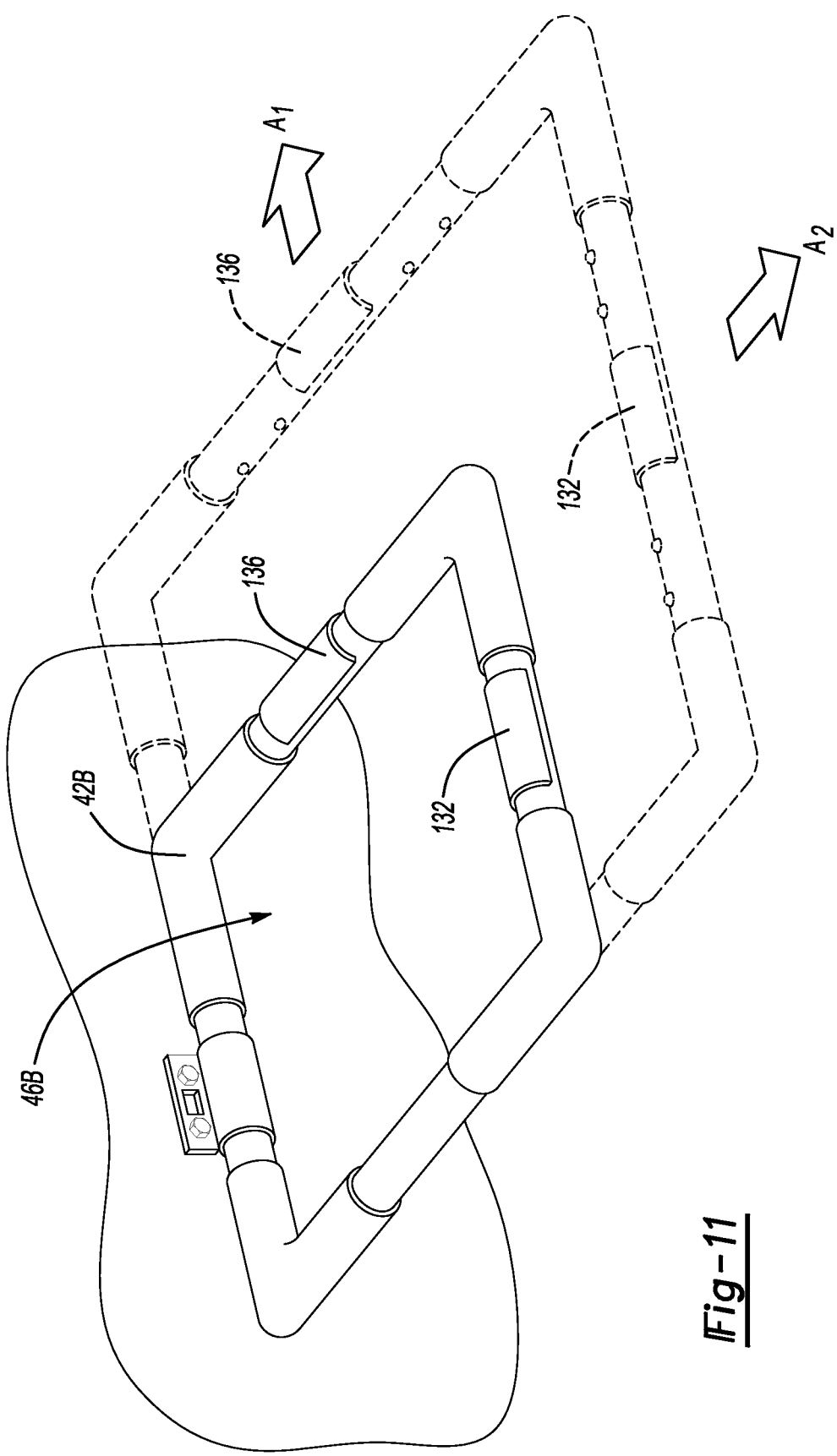
FIG. 11 shows a frame of a cargo management system according to another exemplary aspect of the present disclosure.

With reference now to FIG. 11, A cargo retention frame 42B can extend and retract along a first axis A1. The cargo retention frame 42B can also extend and retract along a second axis A2. Extending and retracting along the axis A1, the axis A2, or both, changes the size of the frame aperture 46B, which allows the cargo retention frame 42B to adapt to cargo of various sizes.

To expand the cargo retention frame 42B along the axis A1, a user can squeeze a handle 132 with their hand to release a release mechanism. While squeezing the handle 132, the user can use their other hand to extent the cargo retention frame 42B along the axis A1.

Correspondingly, to expand the cargo retention frame 42B along the axis A2, a user can squeeze a handle 136 with their hand to release a release mechanism. While squeezing the handle 136, the user can use their other hand to extend the cargo retention frame 42B along the axis A2.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A vehicle cargo management system, comprising:
   an outer member of a cargo retention frame;
   an inner member of the cargo retention frame, the inner member at least partially received within the outer member; and
   a locking device that is transitionable back-and-forth between a locked position and an unlocked position, the outer and inner members are fixed relative to each other when the locking device is in the locked position, the outer and inner members are slidable relative to each other when the locking device is in the unlocked position,
   wherein the cargo retention frame is pivotably secured to a wall of a cargo bed.

2. The vehicle cargo management system of claim 1, wherein the cargo retention frame extends circumferentially continuously about an entire periphery of a frame aperture that is configured to receive cargo.

3. The vehicle cargo management system of claim 2, wherein the inner and the outer members are configured to extend relative to each other to increase a size of the frame aperture, wherein the inner and outer members are configured to retract to decrease a size of the frame aperture.

4. The vehicle cargo management system of claim 1, further comprising a biasing member that biases the cargo retention frame to a stowed position where the cargo retention frame abuts the wall of the cargo bed.

5. The vehicle cargo management system of claim 1, further comprising a hinge system that pivotably secures the cargo retention frame relative to the wall.

6. The vehicle cargo management system of claim 1, wherein the cargo retention frame is configured to pivot relative to the wall about a horizontally extending axis.

7. The vehicle cargo management system of claim 1, wherein the cargo retention frame is configured to pivot relative to the wall about a vertically extending axis.

8. The vehicle cargo management system of claim 1, wherein the cargo retention frame is pivotably secured to a cargo hold of the vehicle.

9. The vehicle cargo management system of claim 8, wherein at least one snap lock feature holds a portion of the cargo retention frame within a groove of the cargo hold to pivotably secure the cargo retention frame to the cargo hold.

10. The vehicle cargo management system of claim 9, wherein the at least one snap lock feature is a bearing.

11. The vehicle cargo management system of claim 1, wherein the cargo retention frame is moveable between a stowed position and an extended position, wherein a first section of the cargo retention frame is folded over a second section of the cargo retention frame when the cargo retention frame is in the stowed position, wherein the first section and the second section are side by side when the cargo retention frame is in the extended position.

12. The vehicle cargo management system of claim 11, wherein the first section is pivotably connected to the second section.

13. The vehicle cargo management system of claim 11, wherein the cargo retention frame is a first cargo retention frame pivotably secured to a driver side cargo bed wall, and further comprising a second cargo retention frame pivotably secured to a passenger side cargo bed wall, the first cargo retention frame in the extended position configured to engage the second cargo retention frame in an extended position such that the first cargo retention frame and the second cargo retention frame together span from the driver side cargo bed wall to the passenger side cargo bed wall.

14. The vehicle cargo management system of claim 13, further comprising at least one hook that engages the first cargo retention frame with the second cargo retention frame when the first and second cargo retention frames are in extended positions.

15. A method of managing cargo, comprising:
holding cargo within an aperture of a cargo retention frame of a frame aperture that is pivotably connected to a vehicle, the frame adjustable to change a size of the frame aperture; and
biasing the frame to a stowed position where the cargo retention frame abuts the wall of a cargo bed of the vehicle.

16. The method of claim 15, wherein the cargo retention frame is pivotably secured to a wall of a vehicle cargo bed.

17. The method of claim 15, further comprising inner members at least partially received within outer members of the frame, wherein the inner members are extended relative to the outer members other to increase a size of the frame aperture, wherein the inner members are retracted relative to the outer members to decrease a size of the frame aperture.

* * * * *